US009882644B2

(12) United States Patent
Ponzini et al.

(10) Patent No.: US 9,882,644 B2
(45) Date of Patent: Jan. 30, 2018

(54) WDM LINK FOR RADIO BASE STATION (75) Inventors: Filippo Ponzini, Pisa (IT); Fabio Cavaliere, Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 130 days.

(21) Appl. No.: 14/385,155

(22) PCT Filed: Mar. 19, 2012

(86) PCT No.: PCT/EP2012/054810
§ 371 (c)(1),
(2), (4) Date: Dec. 14, 2014

(87) PCT Pub. No.: WO2013/139367
PCT Pub. Date: Sep. 26, 2013

(65) Prior Publication Data
US 2015/0117861 A1 Apr. 30, 2015

(51) Int. Cl.
*H04B 10/2575* (2013.01)
*H04J 14/02* (2006.01)
*H04W 88/08* (2009.01)

(52) U.S. Cl.
CPC ... *H04B 10/25758* (2013.01); *H04B 10/2575* (2013.01); *H04J 14/02* (2013.01); *H04W 88/085* (2013.01)

(58) Field of Classification Search
USPC .......................................................... 398/79
See application file for complete search history.

(56) References Cited

U.S. PATENT DOCUMENTS

2002/0075875 A1* 6/2002 Dravida .............. H04L 12/2801
370/395.21
2002/0109875 A1* 8/2002 Eijk ..................... H04B 10/032
398/2

(Continued)

FOREIGN PATENT DOCUMENTS

WO 2011/152831 A1 12/2011

OTHER PUBLICATIONS

PCT International Search Report, dated Jan. 23, 2013, in connection with International Application No. PCT/EP2012/054810, all pages.

(Continued)

*Primary Examiner* — David Payne
*Assistant Examiner* — Omar S Ismail
(74) *Attorney, Agent, or Firm* — Leffler Intellectual Property Law, PLLC (57) ABSTRACT A radio base station has a baseband controller coupled to a radio head by an optical wavelength division multiplexed link to pass downlink signals on a first wavelength, and uplink signals on another wavelength. A compensating delay is applied to one of the signals to compensate for a difference in transmission times between the downlink and the uplink signals. The compensating delay can be controlled according to the difference in wavelengths. By compensating for such differences in transmission times, synchronization problems can be avoided or ameliorated, or transmission distances can be increased. This can result in more flexibility in choice of wavelengths, fiber types and fiber lengths, and greater resilience. This can enable simpler installation or configuration, or reconfiguration without needing to take care to restrict the selection of wavelengths on the WDM link or restrict the length of the link for example.

12 Claims, 8 Drawing Sheets

(56) References Cited

U.S. PATENT DOCUMENTS

| | | | |
|---|---|---|---|
| 2004/0096222 A1* | 5/2004 | Cagenius | H04B 10/25755 398/115 |
| 2004/0239388 A1* | 12/2004 | Lee | H03K 5/131 327/158 |
| 2006/0009235 A1 | 1/2006 | Sheynblat et al. | |
| 2008/0056167 A1* | 3/2008 | Kim | H04B 10/25759 370/294 |
| 2008/0260388 A1 | 10/2008 | Kim et al. | |
| 2009/0297154 A1* | 12/2009 | Izumi | G01M 11/332 398/81 |
| 2010/0079856 A1* | 4/2010 | Sakamoto | H04B 10/2942 359/341.41 |
| 2010/0247105 A1* | 9/2010 | Yu | H04B 10/25758 398/116 |
| 2011/0032910 A1* | 2/2011 | Aarflot | H04J 3/0682 370/335 |
| 2013/0229958 A1* | 9/2013 | Sagae | H04W 72/0406 370/281 |

OTHER PUBLICATIONS

Kardaras, George et al. "Analysis of control and management plane for hybrid fiber radio architectures" 2010 IEEE 12th International Conference on Communication Technology (ICCT), Nov. 11, 2010, IEEE, Piscataway, NJ, USA, XP031850279, ISBN: 978-1-4244-6868-3, pp. 281-284.

Hochwald, Bertrand M. et al. "Adapting a Downlink Array from Uplink Measurements" IEEE Transactions on Signal Processing, IEEE Service Center, New York, NY, USA, vol. 49, No. 3, Mar. 1, 2001, XP011059262, ISSN: 1053-587X, pp. 1-12.

CPRI Specification Version 5.0 "Common Public Radio Interface (CPRI); Interface Specification", Sep. 21, 2011, Ericsson AB, Huawei Technologies Co. Ltd, NEC Corporation, Alcatel Lucent and Nokia Siemens Networks GmbH & Co., KG, pp. 1-119.

* cited by examiner

WDM LINK FOR RADIO BASE STATION

TECHNICAL FIELD

The present invention relates to methods of operating a radio base station having a baseband controller coupled to a radio head by an optical wavelength division multiplexed link, to baseband controllers, to radio heads and to corresponding computer programs.

BACKGROUND

In a typical cellular radio system, wireless user equipment units (UEs) communicate via a radio access network (RAN) to one or more core networks. The user equipment units (UEs) can be mobile telephones laptop computers with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like. The radio access network (RAN) covers a geographical area which is divided into cell areas, with each cell area being served by a radio base station (e.g., BTS, RBS or NodeB). A cell is a geographical area where radio coverage is provided by the radio equipment at a base station site. Each cell is identified by a unique identity, which is broadcast in the cell. The radio base stations communicate over the air interface (e.g., radio frequencies) with the user equipment units (UE) within range of the base stations. In the radio access network, several base stations are typically connected (e.g., by landlines or microwave) to a control node known as a base station controller (BSC) or radio network controller (RNC). The control node supervises and coordinates various activities of the plural radio base stations connected thereto. The radio network controllers are typically connected to one or more core networks. One example of a radio access network is the Universal Mobile Telecommunications System (UMTS) Terrestrial Radio Access Network (UTRAN). The UMTS is a third generation system which builds upon the radio access technology known as Global System for Mobile communications (GSM) developed in Europe. UTRAN provides wideband code division multiple access (WCDMA) to UEs.

In many radio access networks the radio base station is located concentrated at a single site. However, a radio base station can also have a distributed architecture. For example, a distributed radio base station (RBS) can take the form of one or more radio equipment (RE) portions that are linked to a radio equipment control (REC) portion over a radio base station internal interface. Such distributed radio base stations can have a processing Main Unit (MU) at the REC, and at the RE a set of antennas with dedicated RF equipment able to cover multiple radio cells (RRUs), where a single MU is shared among multiple RRUs. This new architectural approach in the RBS implementation requires high capacity, cost effective and low latency transport systems between MU (processing) and RRUs (antennas).

One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 5.0 (2011). Other interfaces can be used, for example the Open Base Station Architecture Initiative (OBSAI) but such alternatives have not yet proved as popular.

This approach of providing "remotization" of the RF part of the RBS from the main unit can bring some notable advantages:

Rationalization of RBS processing unit, with benefits in terms of cost and power consumption, Dynamic allocation of RF and/or processing resources depending on cell load and traffic profiles, and Correlation of data supported by all the antennas which are afferent on the same processing unit. It increases radio link reliability, bandwidth, and coverage and optimizes the power consumption.

This can enable some "cloud computing" concepts to be applied to the radio access networks.

SUMMARY

Embodiments of the invention provide improved methods and apparatus. According to a first aspect of the invention, there is provided a method of operating a radio base station having a baseband controller coupled to a radio head by an optical wavelength division multiplexed link, having the steps of: using the link to pass downlink signals from the baseband controller to the radio head on a first wavelength, and to pass uplink signals from the radio head to the baseband controller on another wavelength. A compensating delay is applied to one of the signals to compensate for a difference in transmission times between the downlink signals on the first wavelength and the uplink signals on the other wavelength.

This is based on a realisation that asymmetric effects such as chromatic dispersion effects, which cause different transmission times for different wavelengths, can cause synchronisation problems. By compensating for such differences in transmission times, the problems can be avoided or ameliorated, or transmission distances can be increased. Notably this can result in more flexibility in choice of wavelengths, fiber types and fiber lengths, and greater resilience. This can enable simpler installation or configuration, or reconfiguration without needing to take care to restrict the selection of wavelengths on the WDM link or restrict the link length for example. If asymmetry in delays is too great, synchronisation between the baseband controller and the radio heads may be affected and compliance with radio standards may be difficult, for purposes such as MIMO transmission, synchronisation with GPS, or time alignment between E-UTRA transmitter branches for example. See FIGS. 1 and 2 for example. The delay can be implemented in any manner, by an electrical or optical delay, fixed or controllable and so on.

Any additional features can be added to the method, or specifically disclaimed from the method, and some are set out in dependent claims and described in more detail.

One such additional feature of some embodiments is the step of determining a difference in wavelength between the first wavelength and the other wavelength and controlling the compensating delay according to the difference in wavelength. Although applying a predetermined fixed compensating delay to approximate for likely transmission time difference is possible, by using this difference in wavelength the compensation can be more accurate. By enabling the compensation to be adapted automatically to changes in wavelength selection, there is more flexibility in selection of wavelength at installation or in use. This can help make automation of wavelength selection easier or ease installation or addition of further radio heads. See FIG. 3 for example.

Another such additional feature is the step of determining a difference in transmission times of the uplink and downlink and controlling the compensating delay according to the difference in transmission times. Although applying a predetermined fixed compensating delay to approximate for likely transmission time difference is possible, it is better if the actual time difference can be estimated or measured and the corresponding compensating delay be applied. See FIG. 4 for example.

Another such additional feature is the step of determining the difference in transmission times being based on the first wavelength and the other wavelength, an amount of chromatic dispersion and on a length of the link. These are some of the main factors likely to affect the transmission times. See FIG. 5 for example.

Another such additional feature is the step of determining the length of the link by determining a round trip delay of the uplink and downlink. This may be done anyway for other purposes in some cases.

Another such additional feature is the uplink or downlink signals comprising digital I and Q signals. This is a convenient way to implement a radio base station so that much of the processing is centralised in the baseband controller.

Another aspect of the invention provides a computer program for a radio base station which when executed by a processor of the radio base station causes the radio base station to carry out the methods set out above. The program can be stored on a non-transitory medium.

Another aspect provides a baseband controller for a radio base station and having an interface for coupling to a radio head over a wavelength division multiplexed link, the baseband controller having a downlink interface to pass downlink signals from the baseband controller to the radio head on a first wavelength, and an uplink interface to receive uplink signals sent from the radio head to the baseband controller on another wavelength. A delay part is configured to apply a compensating delay to one of the signals to compensate for a difference in transmission times between the downlink signals on the first wavelength and the uplink signals on the other wavelength. See FIG. 7 for example.

An additional feature of some embodiments is the baseband controller having a delay control part configured to determine a difference in wavelength between the first wavelength and the other wavelength and to control the delay part to apply the compensating delay in the uplink or downlink signals according to the difference in wavelength. See FIG. 7 for example.

Another such additional feature is the delay control part being arranged to determine a difference in transmission times and controlling a compensating delay in the uplink or downlink signals according to the difference in transmission times.

Another such additional feature is the delay control part being arranged to determine the difference in transmission times based on the first wavelength, and on the other wavelength, on an amount of chromatic dispersion in the link and on a length of the link.

Another such additional feature is the delay control part being arranged to determine the length of the link by determining a round trip delay of the uplink and downlink signals.

Another such additional feature is the delay part comprising a clocked digital register and a clock delay circuit for delaying a clock input to the digital register. This can provide a relatively fine control of delay compensation, to add to coarse control by a framing circuit for example.

Another aspect provides a radio head for a radio base station and having an interface for coupling to a baseband controller, over a wavelength division multiplexed link, the radio head having an RF part for receiving or transmitting radio signals, a downlink interface to receive downlink signals from the baseband controller on a first wavelength, and an uplink interface to send uplink signals to the baseband controller on another wavelength. A delay part is provided for applying a compensating delay to the uplink or downlink signals according to a delay control signal received from the baseband controller to compensate for a difference in transmission times for the uplink and downlink signals. See FIG. 8 for example An additional feature of some embodiments is the delay part comprising a clocked digital register and a clock delay circuit for delaying a clock input to the digital register. This can provide a relatively fine control of delay compensation, to add to coarse control by a framing circuit for example. See FIG. 8 for example.

Another such additional feature is the radio head being arranged to receive a control signal from the baseband controller and configured to control the delay part to apply a compensating delay according to the control signal. See FIG. 8 for example.

Another such additional feature is the uplink or downlink signals comprising digital I and Q signals.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. It will be appreciated by those skilled in the art that block diagrams can represent conceptual views of illustrative circuitry embodying the functionality. Similarly, it will be appreciated that any flow charts, state transition diagrams, pseudocode, and the like represent various processes which may be substantially represented in computer readable medium and so executed by a computer or processor, whether or not such computer or processor is explicitly shown.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described radio base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to base stations are intended to encompass any kind of base station, not limited to those of any particular wireless protocol or frequency, and not limited to being located at a single location and so can encompass distributed base stations having functions at different locations or shared functions in a computing cloud shared between multiple base stations.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to Baseband controller can encompass any kind of controller for a distributed base station including, and not limited to, the REC referred to in the CPRI specification.

References to Radio head can encompass any kind of remote radio part of a distributed radio base station, including, and not limited to, an RRU or an RE.

ABBREVIATIONS

AWG Arrayed Wave Guide
BSC Base Station Controller
CPRI Common Public Radio Interface
DL Downlink
FDD Frequency division Duplexing
GPON Gigabit PON
MU Main Unit
MZM Mach Zehnder Modulator
OBSAI Open Base Station Architecture Initiative
OLT Optical Line Terminal
ONT Optical Network Terminal
P2P Point To Point
PON Passive Optical Network
RBS Radio base Station
RE Radio Equipment
REC Radio Equipment Controller
RF Radio Frequency
RNC Radio Network Controller
RRU Remote Radio Unit
SMF Single Mode Fiber
UE User equipment
UL Uplink
UMTS Universal Mobile Telecommunications System
UTRAN UMTS Terrestrial Radio Access Network
WCDMA wideband code division multiple access
WDM Wavelength Division Multiplexing
3GPP Third Generation partnership project Introduction By way of introduction to the embodiments, how they address some issues with conventional designs will be explained.

Point to point (P2P) optical links can be used for the interface between the baseband controller and radio head or heads. For this interface, WDM systems, especially the ones used in the access (WDM-PON), can enable guaranteed low latency, protocol transparency, high bandwidth and an increased spectral efficiency. The costs, over a 2-5 year time scale projection, can be comparable with conventional optical access technologies, such as P2P and GPON. Nowadays they are realized through a standard protocol named CPRI, transmitted over P2P dedicated optical links. Notably CPRI has pressing constraints in terms of latency (round-trip delay) and in particular in terms of uplink/downlink synchronization.

The CPRI standard recites optical fibers for transmission link up to 10 km, recites determining a round trip delay, and specifies synchronisation and timing accuracies, e.g. link round trip delay accuracy of 16 nsecs.

Figure 1:
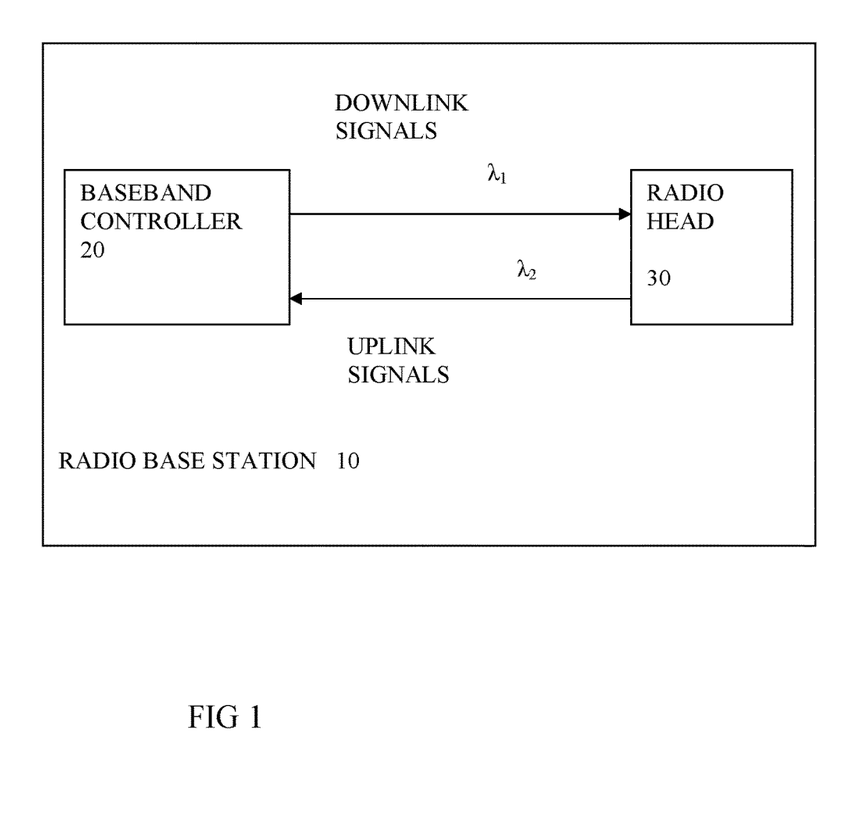
FIG. 1 shows a schematic view of a radio base station.

FIG. 1, Radio Base Station

FIG. 1 shows an example of a radio base station 10 having a baseband controller 20 and a radio head 30. The downlink signals from the baseband controller to the radio head can be in any format, not only I/Q signals. They are sent over the link on wavelength $\lambda_1$.

The uplink signals are sent in the other direction on wavelength $\lambda_2$.

Using WDM technologies as a transmission layer for CPRI could provide great benefits, in terms of efficient use of fiber and MU consolidation. As a drawback, compared with dedicated P2P fiber for each direction, accommodating uplink and downlink streams on different wavelengths can have a detrimental effect on the CPRI synchronization. That effect increase with the length of the link and with the wavelength spacing between uplink and downlink wavelengths.

A safe value for the differential delay between UL and DL in a CPRI stream is about 12 ns ($\Delta T_{CPRI}$). To highlight the effect of chromatic dispersion, consider the extreme case that maximum wavelength spacing compatible with a C+L band WDM-PON is used: 95 nm This value corresponds to choose a couple of channels at the edge of the C-Band (1530 nm) and at the edge of the L-Band (1625 nm)

In G.652 fiber (SMF) the chromatic dispersion index can be assumed the same along the whole C+L Band (rough approximation) and equal to 16 ps/nmKm.

$$\Delta T = D \Delta \lambda L$$

where D is the chromatic dispersion, $\lambda$ is the wavelength spacing and L is the link length.

As a consequence the maximum tolerated distance, compatible with CPRI differential delay ($\Delta T_{CPRI}$) is about 10 km and given by $$L_{MAX} = \frac{\Delta T_{CPRI}}{D\Delta\lambda}$$

This is a limit condition: not applicable if adjacent wavelengths are chosen, but it shows that chromatic dispersion could be significant enough to have a detrimental effect in WDM CPRI or similar transmissions.

FIGS. 2-5, Operational Steps According to Embodiments

Figure 2:
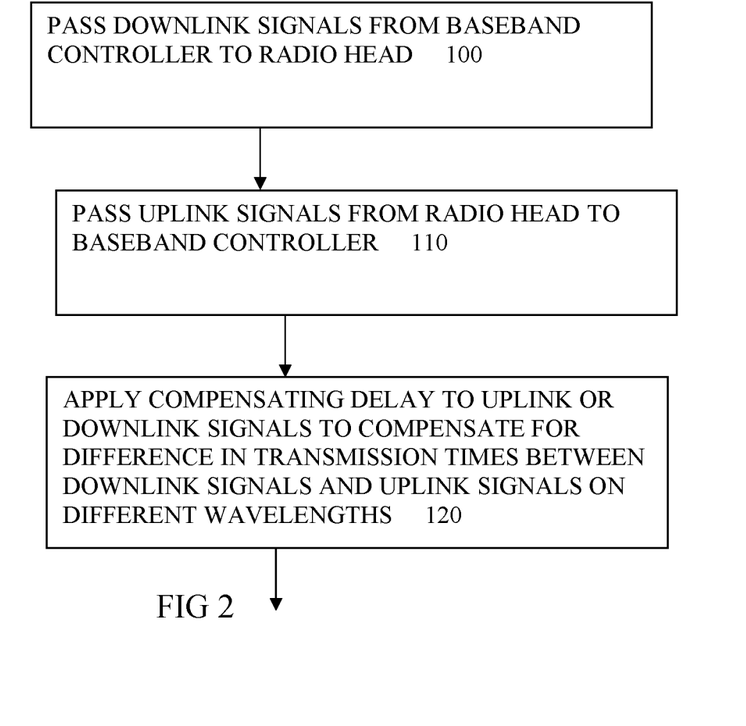
FIG. 2 shows method steps according to an embodiment.

FIG. 2 shows operational steps according to a first embodiment. At step 100 downlink signals are passed from the baseband controller to the radio head, and at the same time or at a different time, uplink signals are passed from the radio head to the baseband controller at step 110. At step 120, a compensating delay is applied to the uplink or the downlink signals to compensate for a difference in transmission time between uplink and downlink signals on different wavelengths. The compensating delay amount could be estimated or calculated, it could be fixed or adaptable to changes in conditions or changes in the wavelength used.

For the case of CPRI, the transmission times depend on the cable link and unless there are asymmetric optical components having asymmetric optical paths, the transmission times can be predictable. A compensating delay can thus be applied to compensate various fiber lengths. By applying a similar compensation to CPRI over WDM links according to different "optical path" for uplink and downlink due to the chromatic dispersion, the difference in transmission times can be overcome.

Figure 3:
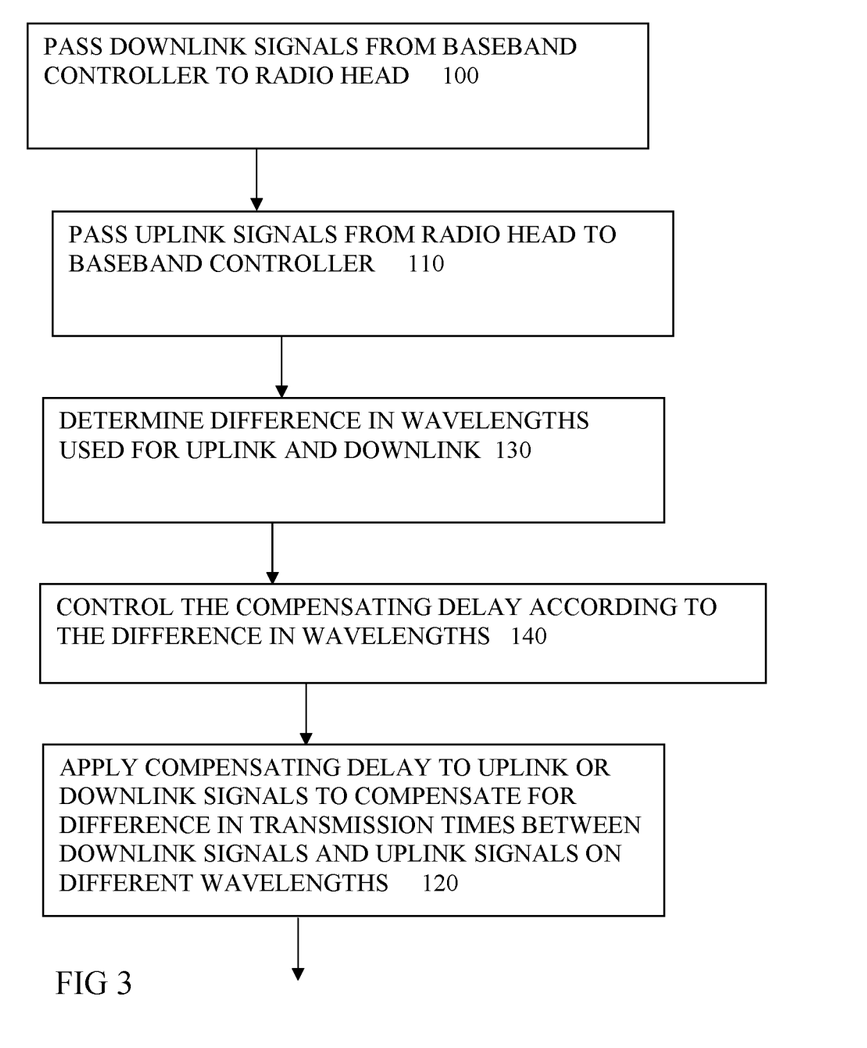
FIG. 3 shows a further embodiment with compensating delay based on wavelengths used.

The compensation can be done applying different delays to UL and DL wavelengths, in accordance to their accumulated chromatic dispersion. The knowledge of UL and DL wavelengths chosen in each CPRI stream can be used to apply the proper delay. This compensation can be applied together with the link length compensation. FIG. 3 shows operational steps similar to those of FIG. 2, but with a step 130 of determining a difference in wavelengths used for uplink and downlink signals. Then at step 140, a compensating delay is controlled according to the determined difference in wavelength. As before, at step 120, a compensating delay is applied to the uplink or the downlink signals to compensate for a difference in transmission time between uplink and downlink signals on different wavelengths.

Figure 4:
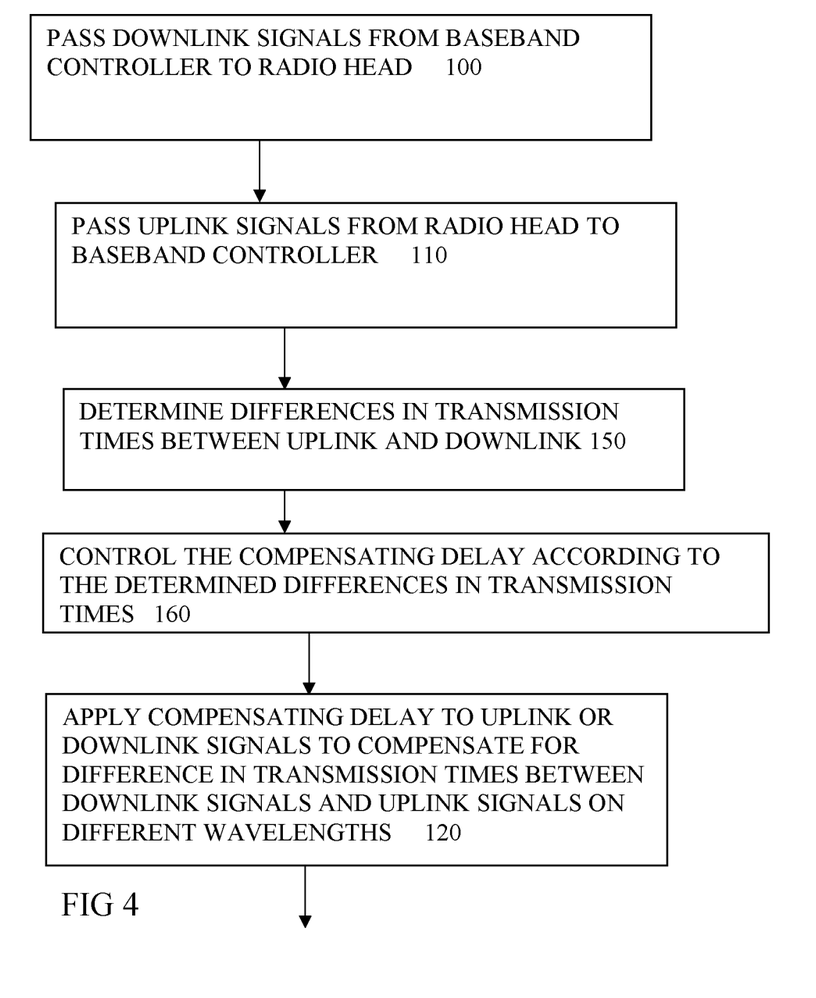
FIG. 4 shows a further embodiment with compensating delay based on determining transmission times.

FIG. 4 shows operational steps similar to those of FIG. 2, but with a step 150 of determining a difference in transmission times used for uplink and downlink signals. Then at step 160, a compensating delay is controlled according to the determined difference in transmission times. As before, at step 120, a compensating delay is applied to the uplink or the downlink signals to compensate for a difference in transmission time between uplink and downlink signals on different wavelengths.

Figure 5:
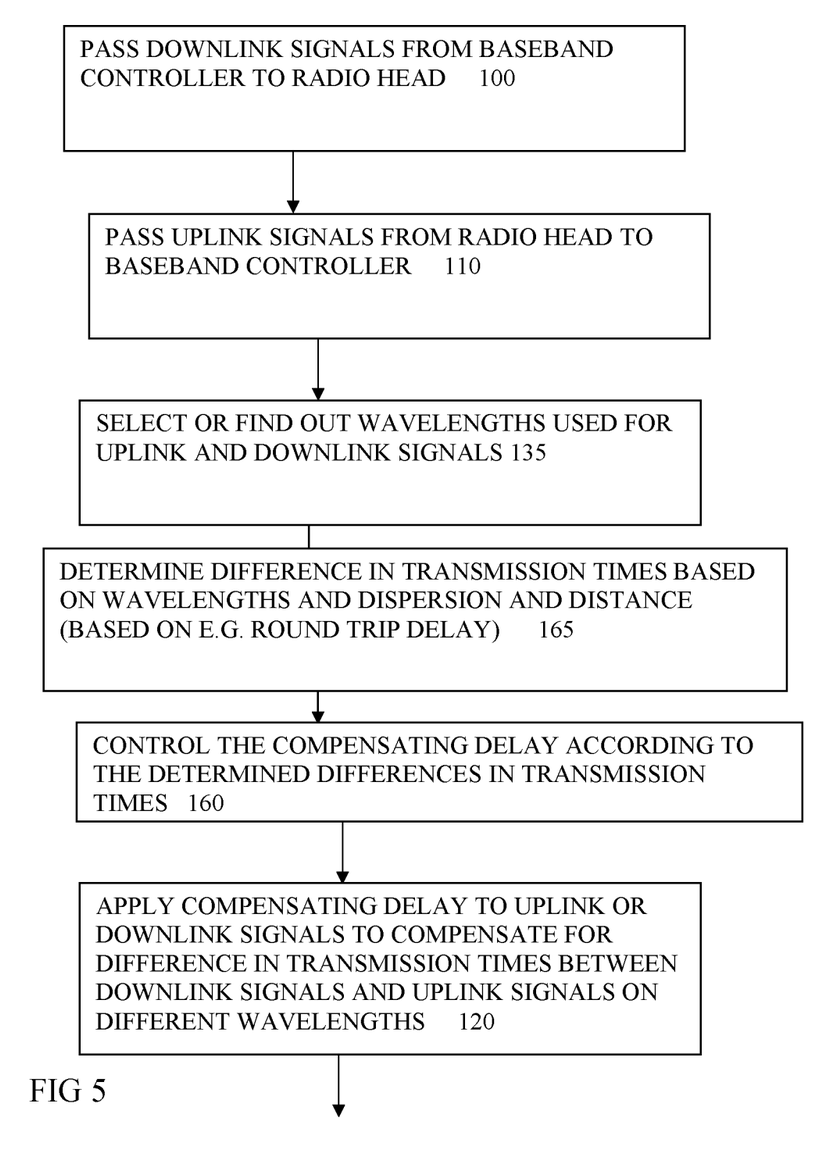
FIG. 5 shows a further embodiment with compensating delay based on determining transmission times according to wavelengths used, dispersion values and link length.

FIG. 5 shows operational steps similar to those of FIG. 2, but with a step 135 of selecting or finding out the wavelengths used for the uplink and downlink signals. Then at step 165, there is a step of determining a difference in transmission times used for uplink and downlink signals based on the wavelengths, and the dispersion and distance along the fiber. Then at step 160, a compensating delay is controlled according to the determined difference in transmission times. As before, at step 120, a compensating delay is applied to the uplink or the downlink signals to compensate for a difference in transmission time between uplink and downlink signals on different wavelengths.

For this example of the method to compensate differential delay experienced by UL/DL between parts of a distributed radio base station, transmitted on different wavelengths, the estimation of the compensating delay uses knowledge of L (length of the fiber link) of dispersion amounts, and of the wavelengths used for uplink ($\lambda_U$) and downlink ($\lambda_D$). The dependence of the signal propagation time by the wavelength is expressed by equation $$\frac{dT}{d\lambda} = \frac{d(L/v_g)}{d\lambda} = LD, \quad v_g = c\left(n - \lambda\frac{dn}{d\lambda}\right)^{-1}$$

where n is the refraction index of fiber and D is the dispersion coefficient.

For the present purposes it is enough to evaluate the difference in timing (asymmetry $\Delta T$) between uplink and downlink and to apply a proper compensating delay to the "fast signal"

$$\Delta T = |T_L - T_U| \approx D|\lambda_L - \lambda_U|L$$

The method can be described with the following steps:
1. Estimation of the fiber link length
2. Compensation, if required, of the fiber link length with a common delay between uplink and downlink.
3. Estimation of the asymmetry between uplink and downlink.
4. Compensation, if required, through a proper delay to the uplink or to the downlink of each CPRI stream.

A worked example of the estimation of asymmetry in the sense of difference in transmission timings is as follows:

A safe value for the differential delay between UL and DL in a CPRI stream is about 12 ns ($\Delta T_{CPRI}$). To highlight the effect of chromatic dispersion, the maximum wavelength spacing compatible with a C+L band WDM-PON: 95 nm is considered. This value corresponds to choosing a couple of channels at the edge of the C-Band (1530 nm) and at the edge of the L-Band (1625 nm), for example $\lambda_U$=1530 nm and $\lambda_D$=1625 nm.

In G.652 fiber the dispersion index @1550 nm is about 16 ps/nmkm, as a consequence the maximum tolerated distance, compatible with CPRI differential delay ($\Delta T_{CPRI}$) is about 10 km and given by $$L_{MAX} = \frac{\Delta T_{CPRI}}{D\Delta\lambda}$$

This is a limit condition: not applicable if adjacent wavelengths are chosen, but it is useful to show that chromatic dispersion could really have a detrimental effect in WDM CPRI transmission.

If the length of the link is about 20 km, without any compensation some synchronization issues can arise. In this case it sufficient to apply a delay of about 20 ns to the fastest link ($\lambda_U$ in this case).

CPRI Examples

CPRI is a digitized and serial internal radio base station interface that establishes a connection between 'Radio Equipment Control' (REC) and 'Radio Equipment' (RE)

enabling single-hop and multi-hop topologies. Three different information flows (User Plane data, Control and Management Plane data, and Synchronization Plane data) are multiplexed over the interface. The specification covers ISO layers 1 and 2. The physical layer (layer 1) supports both an electrical interface (as used in traditional radio base stations), and an optical interface (as used in distributed radio base stations with remote radio equipment).

The radio base station has two basic subsystems, the radio equipment control REC and the radio equipment RE (which are examples of the baseband controller and the radio head of FIG. 1). The radio equipment control and the radio equipment are described further below.

The subsystems REC and RE are also called nodes, when either an REC or an RE is meant. This specification defines the protocols for the physical layer (layer 1) and the data link layer (layer 2). CPRI allows three line bit-rate options. It is mandatory for REC and RE to support at least one of these options, which include: 614.4, 1228.8 and 2457.6 Mbps.

CPRI does not have a mandatory physical-layer protocol. But the protocol used should meet requirements for bit-error-rate (BER), clock stability and noise amongst others. If an optical transceiver is used, Gigabit Ethernet, 10 Gigabit Ethernet, fibre channel or others can be used.

Layer 1 defines: Electrical characteristics, Optical characteristics, Time division multiplexing of the different data flows and Low level signalling. Layer 2 defines Media access control, Flow control, and Data protection of the control and management information flow.

CPRI Data Planes:

The following four data flows are carried:

Control Plane: Control data flow used for call processing.

Management Plane: This data is management information for the operation, administration and maintenance of the CPRI link and the nodes.

User Plane: Data that has to be transferred from the radio base station to the mobile station and vice versa.

Synchronization: Data flow which transfers synchronization and timing information between nodes.

The control plane and management plane are mapped to a Service Access Point SAPCM as described below. For base stations with a suitable functional decomposition, the user plane data is transported in the form of IQ data. Several IQ data flows can be sent via one physical CPRI link. Each IQ data flow reflects the data of one antenna for one carrier, the so-called antenna-carrier (A×C). For base stations with other functional decompositions, the user plane data may not be IQ data.

Radio Functionality

The functional split between REC and RE, can take various forms. The REC is concerned with the Network Interface transport, the radio base station control and management as well as the digital baseband processing. The RE provides the analogue and radio frequency functions such as filtering, modulation, frequency conversion and amplification. An overview on the functional separation between REC and RE is given in the CPRI specification for UTRA FDD, for WiMAX and E-UTRA and for GSM. A functional split of base stations that is different from this section is not precluded by the CPRI specification.

The synchronization part of the interface can include mechanisms to provide precise frame timing information from the REC to the RE. The frame timing information can be recovered on the RE in order to achieve the timing accuracy requirements as described below. The RE can forward frame timing information transparently when forwarding from a slave port to all the master ports. The frame timing information is allocated to the service access point SAPS. Notably CPRI provides a requirement for Round Trip Delay Accuracy according to the supported radio standards.

The round trip time absolute accuracy of the interface, excluding the round trip group delay on the transmission medium (i.e., excluding the cable length), shall meet the following requirement R-21 that accuracy of the round trip delay measurement of cable delay of one link be: 16.276 ns+/−TC/16.

Figure 6:
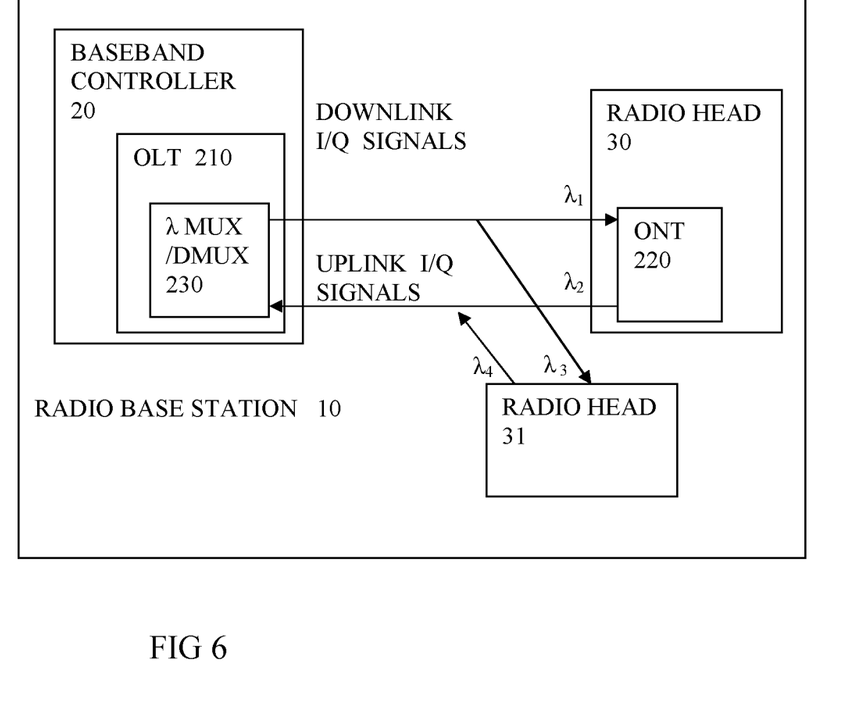
FIG. 6 shows a schematic view of an embodiment of a radio base station with a WDM PON link having an OLT at the baseband controller and an ONT at the radio head.

FIG. 6, Radio Base Station.

FIG. 6 shows a schematic view of an embodiment of a radio base station similar to that of FIG. 1 and with a WDM PON link having an OLT 210 at the baseband controller and an ONT 220 at the radio head. The OLT has a wavelength multiplexer/demultiplexer 230. The downlink and uplink signals are digital I/Q signals. A further radio head 31 is shown, which uses wavelengths λ3 and λ4 respectively. Many more radio heads may be used. Notably since the link is a WDM PON, the wavelengths may be changed or selected automatically, and there is considerable benefit if the delay compensation can be adapted automatically if the difference in wavelengths for uplink and downlink is changed in the field in use.

The description that follows is based on the UMTS (Universal Mobile Telecommunication System) nomenclature. However, the radio base station and the interface may operate in accordance with other radio standards. The baseband controller (REC) can provide an access towards an unillustrated Radio Network Controller via the Iub interface (for the UMTS radio access network). Basically, the baseband controller (REC) is concerned with the Iub transport and Iub protocols, the Node B (base station) control and management, as well as the digital baseband processing. For the downlink (i.e., from baseband controller (REC) to radio head (RE)), the baseband controller (REC) handles such operations as channel coding, interleaving, spreading, scrambling, adding of physical channels, controlling transmit power of each physical channel, frame and slot signal generation (including clock stabilization). For the uplink (i.e., from radio head (RE) to baseband controller (REC)), the baseband controller (REC) handles such operations as channel de-coding, de-interleaving, de-spreading, de-scrambling, signal distribution to signal processing units, detection of feedback information for transmit power control, and signal to interference ratio measurement.

The radio head (RE) serves the air interface to the user equipment (in an UMTS network the air interface is called the Uu interface). The user equipment unit, or mobile station, is not illustrated here. The radio head (RE) provides the analogue and radio frequency functions such as filtering, modulation, frequency conversion and amplification. For the downlink, the radio head (RE) performs operations such as digital to analogue conversion, up conversion, on/off control of each carrier, carrier multiplexing, power amplification and limiting, antenna supervision, and RF filtering. For the uplink, the radio head (RE) performs operations such as analogue to digital conversion, down conversion, automatic gain control, carrier de-multiplexing, low noise amplification, and RF filtering.

Thus, the baseband controller (REC) comprises the radio functions of the digital baseband domain, whereas the radio head (RE) contains the analogue radio frequency functions. The functional split between both parts can be done in such a way that a generic interface based on In-Phase and Quadrature (IQ) data can be defined.

Having the link implemented as being part of a wavelength division multiplexed passive optical network having an OLT 210, and ONT 220, is useful to enable most of the optical components, and all the active optical components, to be centralised at the baseband controller.

Figure 7:
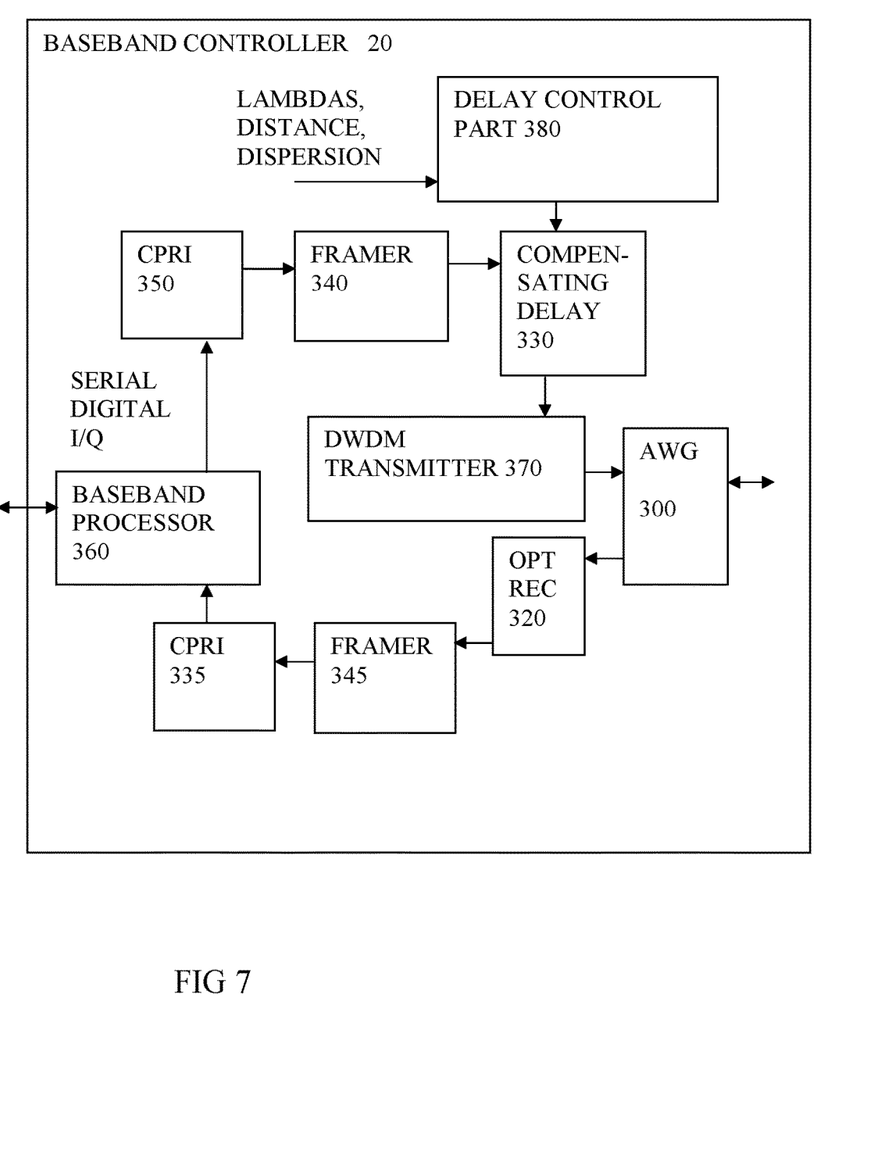
FIG. 7 shows a schematic view of an example of a baseband controller according to an embodiment.

FIG. 7, Example of a Baseband Controller

Figure 8:
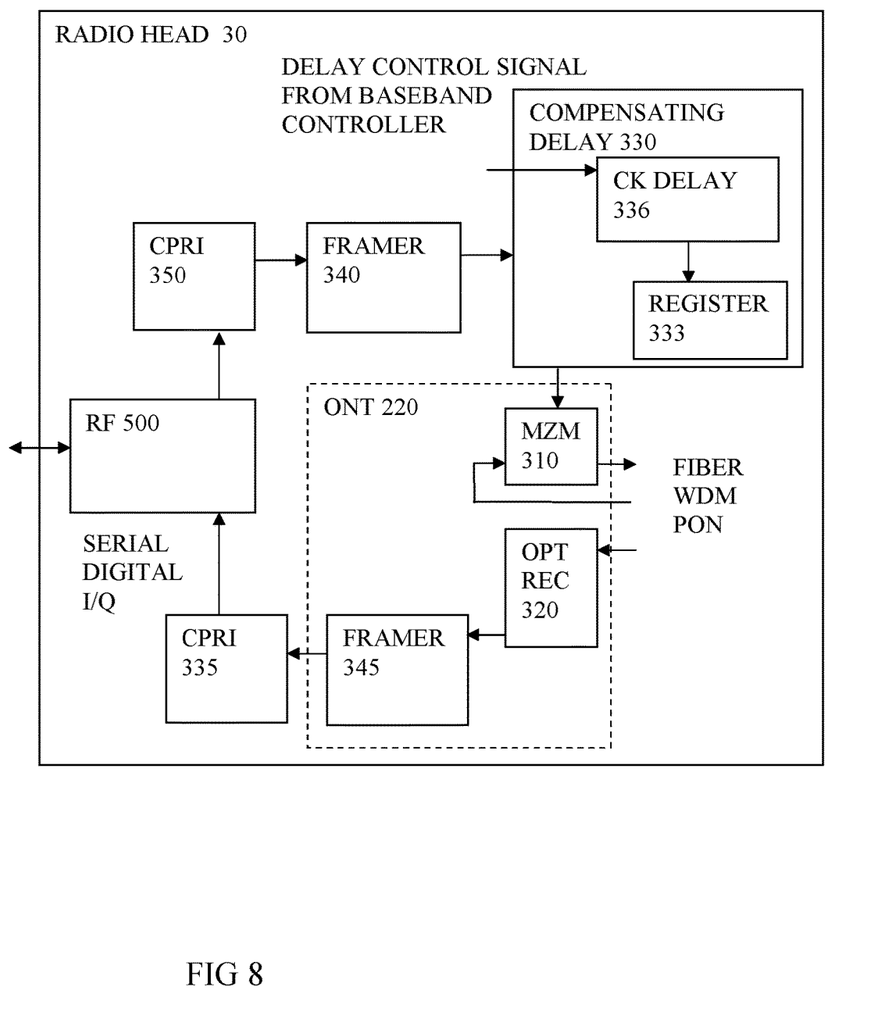
FIG. 8 shows a schematic view of an example of a radio head according to an embodiment.

FIG. 7 shows a schematic view of an example of a baseband controller according to an embodiment. In this example, a baseband processor 360 does much of the digital processing described above. For the downlink the baseband processor outputs a serial digital I/Q stream which is fed to a CPRI part 350 for formatting and handling CPRI functions. This feeds a framer 340, followed by a compensating delay part 330. This is controlled by a delay control part 380 which is arranged to output a desired delay value based in this case on wavelengths, length and dispersion, as discussed above in relation to FIGS. 3 to 5. The compensating delay part 330 can be implemented for example as shown in FIG. 8 using digital electrical circuitry. Other possible implementations of the compensating delay are possible. An optical delay part would be feasible but electrical delay is likely to be less expensive and easier to provide with a controllable delay time. The delay control part can be implemented as a separate logic circuit of any kind, or can be implemented as software executed by a processor used for other purposes, such as the baseband processor 360 for example.

The delayed stream is fed to DWDM transmitter 370 for output as a modulated optical signal on a given wavelength. An AWG 300 multiplexes this wavelength into a WDM signal with other wavelengths, for transmission to the radio head and thus on to the UEs. In the uplink direction the AWG separates each incoming wavelength for detection by an optical receiver 320. A framer part 345 separates a payload which is fed to a CPRI part which handles CPRI interface functions and passes the raw data to the baseband processor.

The baseband controller can have the functions of the optical line terminal (OLT) of the passive optical network carried out by the baseband processor 360 and the DWDM transmitter.

FIG. 8, Example of a Radio Head

FIG. 8 shows a schematic view of an example of a radio head 30 according to an embodiment. An RF part 500 is provided to output and receive RF signals from an antenna. Following established principles, a digital I/Q stream can be output from the RF part to a CPRI part 350 which handles CPRI functions. The stream is output with CPRI information to framer 340. The frames output by this part are delayed by a compensating delay part 330. This can be implemented in various ways. One way is shown. A register 333 is used to buffer the stream, and the register is clocked by a clock output by a clock delay part 336. The amount of delay applied to the clock is selected according to an input in the form of a delay control signal sent from the baseband controller. This can be sent using any overhead channel, or over the CPRI management plane or CPRI synchronization plane in principle.

The delayed I/Q stream is sent as an uplink signal using a modulator such as an MZM 310 for sending data on an uplink wavelength. As shown, this wavelength has itself been sent from the baseband controller, as is usual for a PON network, to keep the active optical parts centralised.

For the downlink, the wavelength is sent to the optical receiver 320 which feeds a framer 345 which leads to a CPRI part 335 which feeds a serial digital I/Q stream to the RF part 500 for transmission over the air. The ONT functions can be implemented by the MZM, optical receiver, and framer parts, within the dotted line as shown.

CONCLUDING REMARKS

As has been described, the compensating delay can be useful when used with the common public radio interface specification v5.0, or with similar interfaces. CPRI is a widely adopted interface standard for ISO layers 1 and 2 of the interface between baseband controllers and radio heads (exemplified by the radio equipment controller and radio equipment respectively in this CPRI specification). Hence it helps enable interoperability if the method is compatible with this. Notably when using WDM-PON as a physical layer for CPRI, the compensating delay in some embodiments can be implemented without any dependence on the wavelength plan. The compensating delay can be done also in combination with conventional P2P links. It can be implemented in various ways, some with a relatively simple estimation of the differential transmission times due to the chromatic dispersion. In some cases expensive hardware changes can be avoided, because the new feature can be realized with a software update. Other variations can be envisaged within the claims.

The invention claimed is:

1. A method of operating a radio base station having a baseband controller coupled to a radio head by an optical wavelength division multiplexed (WDM) link, the method comprising:
   using the optical WDM link to pass downlink signals from the baseband controller to the radio head on a first wavelength, and using the optical WDM link to pass uplink signals from the radio head to the baseband controller on another wavelength, wherein a transmission time to pass from one end of the optical WDM link to another end of the optical WDM link is a function of signal wavelength;
   determining a difference in transmission times between the uplink and downlink signals, wherein the difference in transmission times is caused by the difference in wavelength between the first wavelength and the another wavelength;
   controlling a compensating delay according to the difference in transmission times; and
   applying the compensating delay to one of the uplink and downlink signals to compensate for the difference in transmission times,
   wherein the step of determining the difference in transmission times is based on the first wavelength and the other wavelength, an amount of chromatic dispersion in the optical WDM link and on a length of the optical WDM link.

2. The method of claim 1, comprising the steps of determining a difference in wavelength between the first wavelength and the another wavelength and controlling the compensating delay according to the difference in wavelength.

3. The method of claim 1, comprising the step of determining the length of the optical WDM link by determining a round trip delay of the uplink and downlink.

4. The method of claim 1, wherein the uplink or downlink signals comprise digital I and Q signals.

5. A non-transitory processor-readable storage medium comprising a computer program for a radio base station which, when executed by a processor of the radio base station, causes the radio base station to carry out a method of operating the radio base station, wherein the radio base station has a baseband controller coupled to a radio head by an optical wavelength division multiplexed (WDM) link, and wherein the method comprises:

using the optical WDM link to pass downlink signals from the baseband controller to the radio head on a first wavelength, and using the optical WDM link to pass uplink signals from the radio head to the baseband controller on another wavelength, wherein a transmission time to pass from one end of the optical WDM link to another end of the optical WDM link is a function of signal wavelength;

determining a difference in transmission times between the uplink and downlink signals, wherein the difference in transmission times is caused by the difference in wavelength between the first wavelength and the another wavelength;

controlling a compensating delay according to the difference in transmission times; and applying the compensating delay to one of the uplink and downlink signals to compensate for the difference in transmission times, wherein the step of determining the difference in transmission times is based on the first wavelength and the other wavelength, an amount of chromatic dispersion in the optical WDM link and on a length of the optical WDM link.

6. A baseband controller for a radio base station and having an interface for coupling to a radio head over an optical wavelength division multiplexed (WDM) link, the baseband controller comprising:

a downlink interface to pass downlink signals from the baseband controller to the radio head via the optical WDM link on a first wavelength;

an uplink interface to receive uplink signals sent from the radio head to the baseband controller via the optical WDM link on another wavelength, wherein a transmission time to pass from one end of the optical WDM link to another end of the optical WDM link is a function of signal wavelength, and wherein the baseband controller further comprises:

a delay control part arranged to determine a difference in transmission times between the uplink and downlink signals, wherein the difference in transmission times is caused by the difference in wavelength between the first wavelength and the another wavelength, and wherein the delay control part is further arranged to control a compensating delay according to the difference in transmission times; and a delay part configured to apply the compensating delay to one of the uplink and downlink signals to compensate for the difference in transmission times, wherein the delay control part is arranged to determine the difference in transmission times based on the first wavelength and the other wavelength, on an amount of chromatic dispersion in the optical WDM link and on a length of the optical WDM link.

7. The baseband controller of claim 6 wherein the delay control part is configured to determine a difference in wavelength between the first wavelength and the another wavelength and to control the delay part to apply the compensating delay in the uplink or downlink signals according to the difference in wavelength.

8. The baseband controller of claim 6, wherein the delay control part is arranged to determine the length of the optical WDM link by determining a round trip delay of the uplink and downlink signals.

9. The baseband controller of claim 6, wherein the delay part comprises a clocked digital register and a clock delay circuit for delaying a clock input to the digital register.

10. A radio head for a radio base station and having an interface for coupling to a baseband controller, over an optical wavelength division multiplexed (WDM) link, the radio head comprising:

an RF part for receiving or transmitting radio signals;

a downlink interface to receive downlink signals from the baseband controller via the optical WDM link on a first wavelength;

an uplink interface to send uplink signals to the baseband controller via the optical WDM link on another wavelength, wherein a transmission time to pass from one end of the optical WDM link to another end of the optical WDM link is a function of signal wavelength, and wherein the radio head further comprises:

a delay control part arranged to receive a delay control signal from the baseband controller; and a delay part for applying a compensating delay to the uplink or downlink signals according to the delay control signal received from the baseband controller, wherein the delay control signal is configured to compensate for a difference in transmission times between the uplink signals on the another wavelength and the downlink signals on the first wavelength, wherein the difference in transmission times is caused by the difference in wavelength between the first wavelength and the another wavelength, and wherein the difference in transmission times is determined based on the first wavelength and the other wavelength, on an amount of chromatic dispersion in the optical WDM link and on a length of the optical WDM link.

11. The radio head of claim 10, wherein the delay part comprises a clocked digital register and a clock delay circuit for delaying a clock input to the digital register.

12. The radio head of claim 10, wherein the uplink or downlink signals comprise digital I and Q signals.

* * * * *